United States Patent
Gessner

(10) Patent No.: US 7,029,419 B2
(45) Date of Patent: Apr. 18, 2006

(54) AUTOMATIC TRANSMISSION DOWNSHIFTS BASED ON TIRE ADHESION LIMITS

(75) Inventor: James M. Gessner, Highland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/659,141

(22) Filed: Sep. 9, 2003

(65) Prior Publication Data

US 2005/0054481 A1 Mar. 10, 2005

(51) Int. Cl.
*F16H 59/60* (2006.01)
*F16H 59/62* (2006.01)
*G06F 17/00* (2006.01)
*G06F 19/00* (2006.01)

(52) U.S. Cl. .......................... 477/97; 701/65

(58) Field of Classification Search ............. 477/97, 477/900, 904; 701/53, 65, 66
See application file for complete search history.

(56) References Cited

U.S. PATENT DOCUMENTS

| | | | |
|---|---|---|---|
| 5,483,446 A * | 1/1996 | Momose et al. ............... 701/1 |
| 5,655,995 A * | 8/1997 | Kondo et al. ............... 477/155 |
| 5,794,170 A * | 8/1998 | Kuroda et al. ............... 701/93 |
| 6,292,736 B1 * | 9/2001 | Aruga et al. ............... 701/95 |
| 6,671,601 B1 * | 12/2003 | Abiru ......................... 701/51 |
| 2002/0091472 A1 * | 7/2002 | Jager et al. ................. 701/34 |
| 2003/0121319 A1 * | 7/2003 | Kojima et al. ............. 73/146.2 |

FOREIGN PATENT DOCUMENTS

JP 08028695 A * 2/1996

* cited by examiner

*Primary Examiner*—Tisha Lewis
(74) *Attorney, Agent, or Firm*—Christopher DeVries

(57) ABSTRACT

A shift control system that controls gear shifts in a vehicle includes a transmission and a controller. The controller detects driving conditions of the vehicle, estimates a traction load of the vehicle and determines a current traction load of the vehicle. The controller shifts the transmission based on the current traction load and the estimated traction load if the driving conditions are met. The current traction load is based on a lateral acceleration signal and a longitudinal acceleration signal. The estimated traction load is based on a curb weight of the vehicle, a weight transfer gain and an acceleration signal.

20 Claims, 2 Drawing Sheets

AUTOMATIC TRANSMISSION DOWNSHIFTS BASED ON TIRE ADHESION LIMITS

FIELD OF THE INVENTION

The present invention relates to automatic transmission gear shifts and more particularly to control systems for limiting automatic transmission gear shifts.

BACKGROUND OF THE INVENTION

Vehicles include an engine that drives at least one wheel through a transmission. The transmission selectively shifts gear ratios to adjust the speed and torque output to the wheel based on throttle input, vehicle load and other factors. A transmission up-shift enables the engine to drive the wheel at a higher speed with lower torque. A downshift enables the engine to drive the wheel at a lower speed with higher torque.

During driving, tires associated with the driven wheels frictionally engage a road surface. The adhesion or traction of the tires on the road surface is proportional to the vertical load on the wheel, a coefficient of friction between the wheel and the surface. The traction of the tires on the road surface impacts vehicle control. For example, traction on ice is significantly lower than dry pavement.

Transmission shifts may induce torque disturbances in the drivetrain, which may adversely impact wheel traction. The traction loss may be more pronounced during acceleration or turning of the vehicle.

SUMMARY OF THE INVENTION

The present invention provides a shift control system for controlling gear shifts in a vehicle. The shift control system includes a transmission and a controller. The controller detects driving conditions of the vehicle, estimates a traction load of the vehicle and determines a current traction load of the vehicle. The controller shifts the transmission based on the current traction load and the estimated traction load if the shift conditions are met.

In one feature, the shift is a downshift.

In another feature, the controller determines the current traction load based on a lateral acceleration signal and a longitudinal acceleration signal. A lateral accelerometer generates the lateral acceleration signal and a longitudinal accelerometer generates the longitudinal acceleration signal. It is also anticipated that the longitudinal acceleration can be calculated by the controller.

In still another feature, the controller estimates the traction load based on a curb weight of the vehicle, a weight transfer gain and an acceleration signal. An accelerometer generates the acceleration signal. The weight transfer gain represents changes in vehicle weight distribution based on vehicle acceleration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
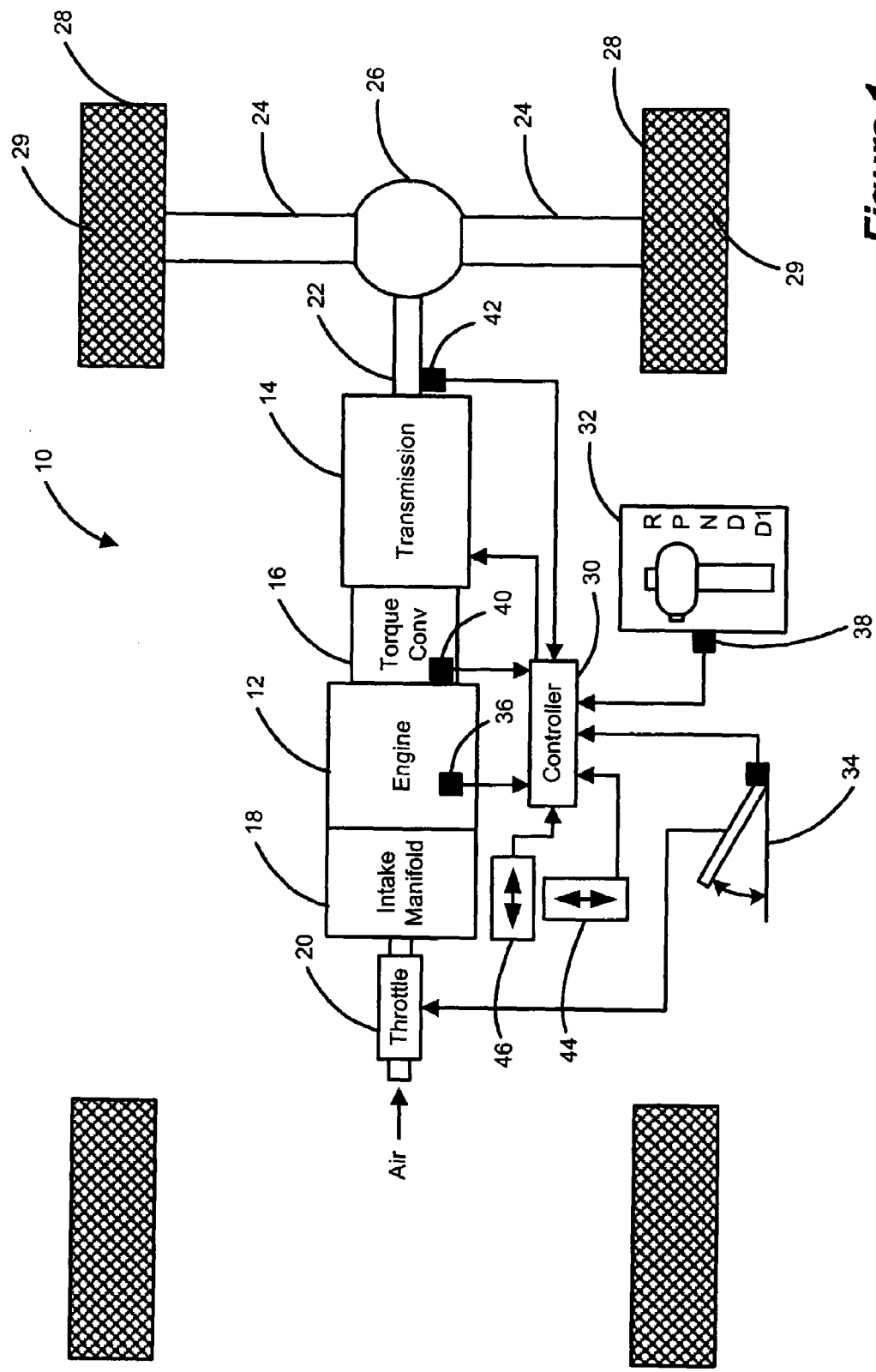
FIG. 1 is a functional block diagram of a vehicle including a downshift limiting system.

The following description of the preferred embodiment is merely exemplary in nature and is in no way intended to limit the invention, its application, or uses. For purposes of clarity, the same reference numbers will be used in the drawings to identify similar components.

Referring now to FIG. 1, an exemplary vehicle 10 includes an engine 12 that drives an automatic transmission 14 through a torque converter 16. The torque converter 16 enables start-off, provides torque multiplication and absorbs harmonic vibrations within the vehicle drivetrain. Air is drawn into an intake manifold 18 of the engine through a throttle 20. The air is combusted with fuel in cylinders of the engine 12 to produce drive torque. The transmission 14 drives a drive shaft 22 that in turn drives axles 24 through a differential 26. The axles 24 drive wheels 28 including tires 29 to move the vehicle 10. It is appreciated that the layout of the vehicle 10 is merely exemplary in nature. It is anticipated that the present invention described herein can be implemented with other vehicle configurations, such as a front wheel drive (FWD) vehicle where the transmission directly drives a differential.

The transmission 14 includes gear sets (not shown) that selectively interconnect input and output shafts (not shown). Typically, the gear sets include planetary gear sets selectively manipulated by clutches (not shown) to control the transmission gear ratio. The input shaft is coupled to the engine 12 via the torque converter 16. The output shaft is coupled to the drive shaft 22.

A controller 30 defines gear selection and shift points and regulates demand-response shifting of the transmission 14. Demand-response shifting is based on a shift program that is selected by the driver using a selector 32, a position of an accelerator 34, engine operating conditions, vehicle speed and other vehicle operating conditions. The controller 30 commands hydraulic actuation of the clutches. The controller 30 actuates gear selection and modulates the clutch pressure electronically in accordance with the torque flowing through the transmission 14.

The controller 30 communicates with an engine speed sensor 36 that monitors engine speed and a position sensor 38 that monitors a selector position of the gear selector 32. A load sensor 40 and speed sensor 42 monitor a torque converter load and the rotational speed of the drive shaft 22, respectively. A lateral accelerometer 44 measures lateral acceleration of the vehicle 10 and generates a lateral acceleration signal that is input to the controller 30. However, it is anticipated that the controller 30 can calculate lateral acceleration based on vehicle operating conditions instead of directly measuring lateral acceleration. For example, lateral acceleration could be calculated based on differential wheel speed between the left and right side wheels 29. Similarly, longitudinal acceleration can be determined in several manners. For example, a longitudinal accelerometer 46 measures longitudinal acceleration of the vehicle 10 and generates a longitudinal acceleration signal that is input to the controller 30. Alternatively, it is anticipated that the controller 30 can monitor changes in vehicle speed over a period of time and determine longitudinal acceleration based on the change in speed divided by the time period.

The present invention provides a downshift control system that selectively prohibits downshifts when the tires 29 are at the limit of adhesion to the road surface. The downshift control system can be executed by the controller 30, although the downshift control system can be executed by another controller or additional controllers. The maximum traction load that the tires 29 can generate is proportional to a vertical load on the tires 29 and the coefficient of friction between the tires 29 and the road surface. The control system estimates a current traction load (CTL) that is generated by the driven tires 29. Downshift of the transmission 14 is prohibited if the CTL is not sufficiently below a maximum theoretical traction load (MTTL).

Figure 2:
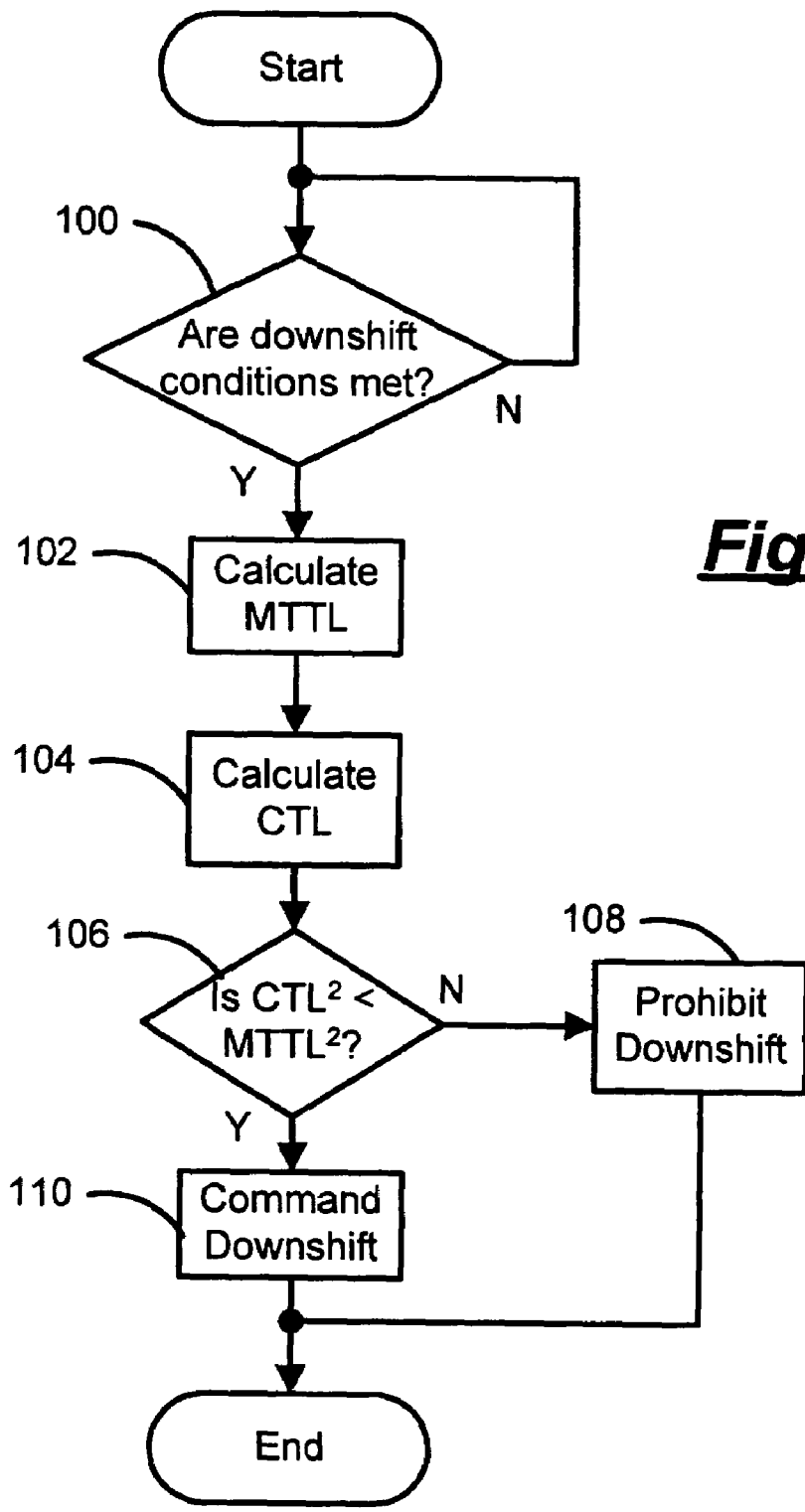
FIG. 2 is a flowchart illustrating steps that are performed by the downshift limiting system according to the present invention.

With reference to FIG. 2, the steps performed by the downshift control system will be described in detail. In step 100, control determines whether the current vehicle driving conditions are appropriate for a downshift. These driving conditions include throttle position, engine speed, drive shaft speed or transmission output shaft speed depending on the particular configuration of the vehicle 10, and torque converter load. It will be appreciated that the driving conditions herein are merely exemplary and not exhaustive of the driving conditions that may influence a downshift decision. If the downshift conditions are not met, control loops back. If the downshift conditions are met, control continues in step 102.

In step 102, control estimates the MTTL. MTTL is based on a maximum load calibration (MLC), a weight transfer gain ($w_{transfer}$), and a filtered vehicle acceleration ($a_{veh}$) according to the following equation:

$$MTTL = MLC + (w_{transfer})(a_{veh})$$

MLC is measured in g's (kph/s×0.028303) and represents the maximum traction load of the driven tires 29 based on the curb weight of the vehicle 10. MLC can be calculated and/or pre-programmed in memory. MLC includes a safety factor to account for variations in the coefficient of friction between the tires 29 and road surface and to account for torque disturbances caused by downshift. $w_{transfer}$ is a scaler representing the change in vehicle weight distribution based on the change in vehicle speed (i.e. acceleration). $w_{transfer}$ is empirically calculated based on vehicle parameters including center of gravity and wheelbase. For a rear wheel drive vehicle, $w_{transfer}$ is greater than zero. $w_{transfer}$ is less than zero for a front wheel drive vehicle. $a_{veh}$ is calculated by the controller 30 based on the change in vehicle speed over a predetermined time period.

In step 104, control estimates a current traction load (CTL). CTL is based on a current lateral acceleration ($a_{lat}$) and a current longitudinal acceleration ($a_{long}$) according to the following equation:

$$CTL = [(a_{lat})^2 + (a_{long})^2]^{1/2}$$

where $a_{lat}$ and $a_{long}$ are respectively measured in g's by the lateral and longitudinal accelerometers 44, 46, respectively. $a_{long}$ is equal to $a_{veh}$. Alternatively, as discussed above $a_{lat}$ and $a_{long}$ can be calculated by the controller 30 based on vehicle operating conditions.

In step 106, control compares the squares of MMTL and CTL. If the square of CTL is greater than the square of MTTL control continues in step 108. Otherwise control continues in step 110. In step 108, control prohibits downshift of the transmission 14. In step 110, control commands the transmission 14 to downshift.

The shift control of the present invention improves vehicle control. By prohibiting downshift in instances of reduced adhesion between the tires and road surface, the shift control prevents loss of traction that could otherwise result from torque disturbances to the driven tires due to downshift. The shift control only prohibits downshift in cases where the current traction load is not sufficiently below the maximum theoretical traction load.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A shift control system for controlling gear shifts in a vehicle, comprising:
   a transmission;
   a controller that detects driving conditions of said vehicle, that indicates a downshift of said transmission based on said driving conditions, that estimates a traction load of said vehicle, that determines a current traction load of said vehicle, that selectively inhibits said downshift if a square of said current traction load is less than a square of said estimated traction load.

2. The shift control system of claim 1 wherein said controller determines said current traction load based on a lateral acceleration signal and a longitudinal acceleration signal.

3. The shift control system of claim 2 further comprising:
   a lateral accelerometer that generates said lateral acceleration signal; and
   a longitudinal accelerometer that generates said longitudinal acceleration signal.

4. The shift control system of claim 2 wherein said controller calculates said longitudinal acceleration based on a change in vehicle speed over time.

5. The shift control system of claim 1 wherein said controller estimates said traction load based on a curb weight of said vehicle, a weight transfer gain and an acceleration signal.

6. The shift control system of claim 5 further comprising an accelerometer that generates said acceleration signal.

7. The shift control system of claim 5 wherein said weight transfer gain represents changes in vehicle weight distribution based on vehicle acceleration.

8. A method of controlling automatic transmission shifts in a vehicle, comprising:
   detecting driving conditions of said vehicle;
   indicating a downshift of a transmission based on said driving conditions;
   estimating a traction load of said vehicle;
   calculating a current traction load of said vehicle; and
   selectively inhibiting said downshift if a square of said current traction load is less than a square of said traction load.

9. The method of claim 8 wherein said current traction load is based on a lateral acceleration signal and a longitudinal acceleration signal.

10. The method of claim 9 further comprising:
generating said lateral acceleration signal with a lateral accelerometer; and
generating said longitudinal acceleration signal with a longitudinal accelerometer.

11. The method of claim 9 wherein said longitudinal acceleration is calculated based on a change in vehicle speed over time.

12. The method of claim 8 wherein said traction load is based on a curb weight of said vehicle, a weight transfer gain and an acceleration signal.

13. The method of claim 12 further comprising generating said acceleration signal with an accelerometer.

14. The method of claim 12 wherein said weight transfer gain represents changes in vehicle weight distribution based on vehicle acceleration.

15. A method of controlling automatic transmission downshift of a vehicle, comprising:
detecting downshift conditions;
estimating a traction load of said vehicle based on a lateral acceleration signal;
estimating a current traction load of said vehicle based on a longitudinal acceleration signal; and
selectively inhibiting said downshift if a square of said current traction load is less than a square of said traction load.

16. The method of claim 15 further comprising:
generating said lateral acceleration signal with a lateral accelerometer; and
generating said longitudinal acceleration signal with a longitudinal accelerometer.

17. The method of claim 15 wherein said longitudinal acceleration signal is calculated based on a change in vehicle speed over time.

18. The method of claim 15 wherein said traction load is based on a curb weight of said vehicle, a weight transfer gain and an acceleration signal.

19. The method of claim 18 further comprising generating said acceleration signal with an accelerometer.

20. The method of claim 18 wherein said weight transfer gain indicates changes in vehicle weight distribution based on vehicle acceleration.

* * * * *